E. H. STAYT.
SUPPORT OR STAND FOR BICYCLES.
APPLICATION FILED NOV. 5, 1908.
920,785.
Patented May 4, 1909.
2 SHEETS—SHEET 1.
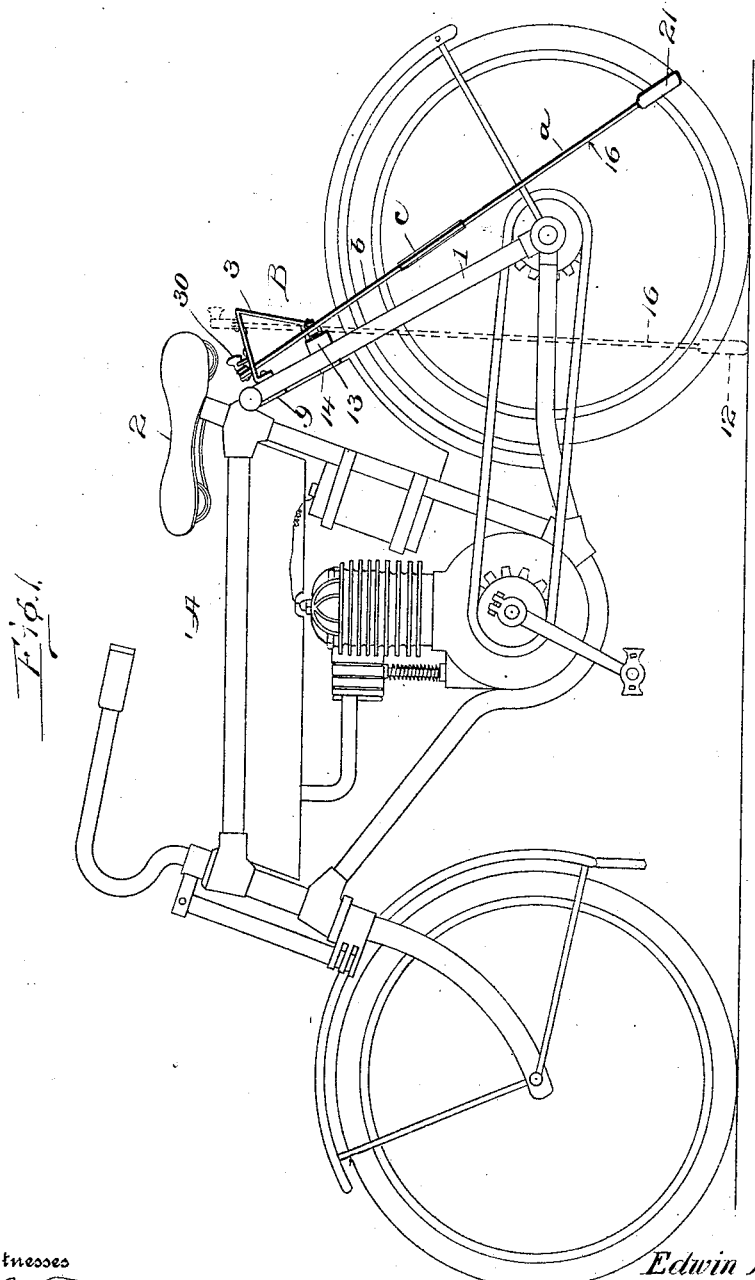
Witnesses
G. F. Folson,
C. Bradway.
Inventor
Edwin H. Stayt.
By Victor J. Evans
Attorney

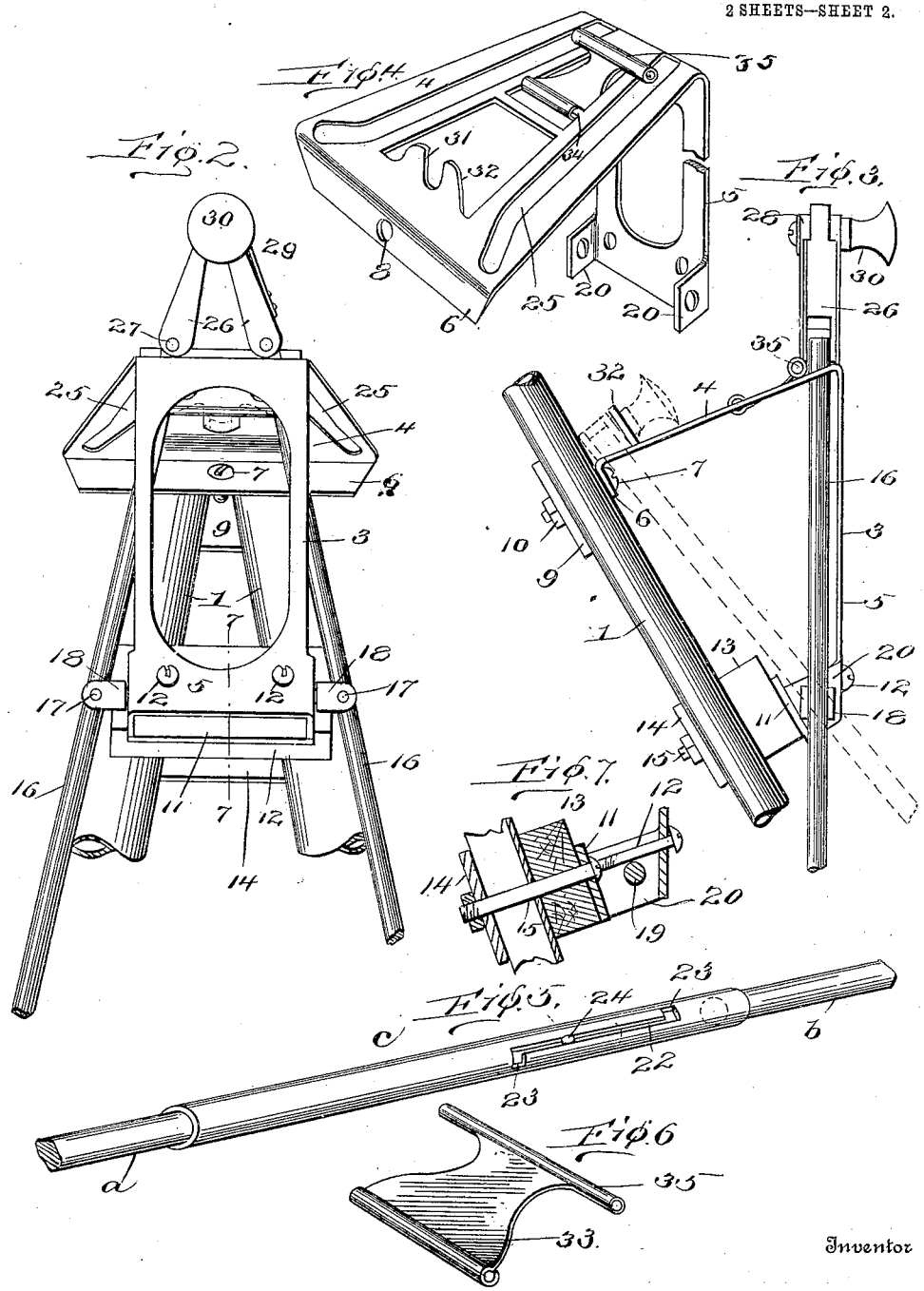

UNITED STATES PATENT OFFICE.

EDWIN HOKE STAYT, OF SPOKANE, WASHINGTON.

SUPPORT OR STAND FOR BICYCLES.

No. 920,785.  Specification of Letters Patent.  Patented May 4, 1909.

Application filed November 5, 1908. Serial No. 461,168.

*To all whom it may concern:*

Be it known that I, EDWIN HOKE STAYT, a citizen of the United States, residing at Spokane, in the county of Spokane and State of Washington, have invented new and useful Improvements in Supports or Stands for Bicycles, of which the following is a specification.

This invention relates to a support or stand for bicycles, motorcycles and the like, whereby the vehicle can be supported in upright position at any place.

The invention has for one of its objects to provide a device of this character which is comparatively simple and inexpensive to manufacture, readily applied to a bicycle frame of any ordinary design, and readily adjusted to support the cycle when not in use.

Another object of the invention is the provision of a pair of swinging supporting members or legs mounted at the rear of the bicycle frame just behind the seat and adapted to be thrown forwardly and outwardly in opening the device to support the cycle or to be thrown rearwardly and inwardly close to the rear wheel when the device is closed during the use of the cycle.

Another object of the invention is to provide improved means for holding the supporting legs in either open or closed position, which means are so designed as to permit the legs to be manipulated with great facility.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side view of a motorcycle with the stand or support mounted thereon. Fig. 2 is a rear view of the device. Fig. 3 is a side view thereof. Fig. 4 is a perspective view of the top portion of the frame of the device. Fig. 5 is a fragmentary perspective view of one of the extensible legs. Fig. 6 is a perspective view of the keeper or lock for holding the legs in operative position. Fig. 7 is a detail sectional view on line 7—7 Fig. 2.

Similar reference characters are employed to designate corresponding parts throughout the views.

Referring to the drawing, A designates a motor cycle, and B, the support or standard therefor, which is applied to the frame of the vehicle by attachment to the rear inclined bars 1 at a point adjacent the seat 2.

The device B consists of a triangular frame 3 constructed of sheet metal and bent into an approximately horizontal top plate 4 and a depending plate 5. The top plate 4 has a depending flange 6 at its front which bears against the rear sides of the bars 1 of the vehicle frame, and a clamping bolt 7 extends through an aperture 8 of this flange and between the frame bars 1 and through a clamping plate 9 which bears against the front side of the bars 1 so that the nut 10 of the bolt will tightly clamp the parts in position. The lower end of the frame is fastened to a plate 11 by means of screws 12 that pass through the lower part of the frame and screw into the plate 11 and this plate is disposed behind a block 13 of wood or other suitable material that bears against the rear sides of the tubes 1 of the bicycle frame and a clamping plate 14 is disposed against the front sides of the tubes and a fastening bolt 15 passes through the plates 11 and 14 and block 13 so as to firmly secure the frame 3 of the device on the bicycle frame. The block 13 may be varied in thickness according to the design of the bicycle so that the supporting legs of the device will clear the hub of the rear wheel in the opening and closing movement of the device, and furthermore, the frame 3 can be raised or lowered on the bicycle frame to bring the lower ends of the supporting legs in proper relation to the ground when the device is opened. The frame 3 supports the rod-like legs 16 which are fulcrumed at 17 in the bifurcated ends 18 of a shaft 19 which rocks in bearing lugs 20 on the lower portion of the frame 3. The legs are thus capable of tilting on the pivots 17 as one axis and on the shaft 19 as another axis, the said axes being disposed at right angles to each other. By thus mounting the legs, they can be thrown forwardly and outwardly at the same time to be spread apart at a sufficient angle to suitably support the bicycle, or thrown rearwardly and inwardly close to the rear wheel so as to be out of the way when the bicycle is used. On the lower ends are feet 21 which are adapted to engage the ground when the device is open and the frame 3 is so adjusted that the feet will just touch the ground when the device is open. The legs 16 may be made in two parts $a$ and $b$ connected together by a sleeve $c$ that has a bayonet slot 22 having offset or recessed extremities 23 for receiving a pin 24 which is secured to the section $a$ so that the latter can be moved inwardly or outwardly in expanding or contracting the legs, the sleeve $c$ being rigidly secured to the section $b$. By providing extensible legs, the rear wheel can be supported off the ground so as to facilitate repair, this provision being especially useful in connection with motorcycles. The upper extremities of the legs 16 pass through rearwardly-converging slots 25 in the top plate 4 of the frame 3, so that by moving the upper extremities of the legs backwardly or forwardly, the slots will cause them to move to open or closed position. The upper extremities of the legs are connected together by a toggle joint consisting of links 26 that are hingedly connected at 27 with the legs and hingedly connected to each other by a pivot 28, and these links are of such length that when the upper ends of the legs are disposed in the forward extremities of the slots 25, the toggle joint will be straightened so as to thus lock the legs in closed position. To hold the toggle joint open or straightened, a leaf spring 29 is secured to one of the links and is adapted to extend across the middle joint between the links and bear on top of the opposite link for preventing the toggle joint from collapsing accidentally. When the toggle joint is straightened, the parts will be in the full line position shown in Fig. 1 and dotted line position shown in Fig. 3. At the hinged connection between the links is a grip or handle 30 whereby the device can be manipulated for throwing the legs to operative or inoperative position, and this handle sets in a notch 31 of an upwardly-extending tongue 32 on the top plate which assists in holding the legs in inoperative or closed position. On the top plate 4 is a pivoted keeper or lock 33 that turns on a pintle 34 formed on the top frame, and this keeper is provided with a cross bar 35 which is adapted to extend across the upper extremities of the legs when the latter are in open position so as to lock the same against movement. To release the legs, the keeper is thrown forwardly so that the upper extremities of the legs can move freely in the slots 25 of the top plate.

The operation of the device will be understood from the following brief description. When the bicycle support or stand is not in use, the supporting legs 16 will be in the full line position shown in Fig. 1 so as not to be in the way of the rider in mounting or dismounting. When it is desired to employ the device to support the bicycle when not in use, the handle 30 is grasped and pulled rearwardly so as to cause the legs 16 to swing forwardly and outwardly to bring the feet thereof into engagement with the ground. In this outstanding position of the legs, the bicycle will be firmly supported and prevented from falling laterally, and when in this position, the keeper or lock 33 is swung rearwardly into engagement with the upper extremities of the legs so as to hold the latter in the rear ends of the slots 25. When the bicycle is to be again used, the legs are thrown to inoperative position by pushing forwardly on the handle 30 to thereby swing the legs rearwardly and inwardly close to the rear wheel, and during this movement, the toggle links are straightened and locked when the legs reach the forward ends of the slots 25. If it is desired to raise the rear portion of the bicycle or motor-cycle for the purpose of taking out the rear wheel or repairing some parts, the legs 16 can be first extended in the full line position, Fig. 1, so that when the device is open, the rear wheel of the vehicle will be raised off the ground.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. A bicycle stand comprising a frame adjustably mounted on the bicycle frame and having slots, supporting members mounted on the frame to swing on axes disposed at right angles to each other, the upper extremities of the members being guided by the slots and devices for holding the supporting members in operative or inoperative position at the opposite ends of the slot.

2. In a device of the class described, the combination of a supporting frame, legs pivotally mounted thereon, toggle links connected with the legs and arranged to hold the latter in inoperative position when the links are straightened, and a pivoted latch on the frame arranged to engage the legs for holding the same in operative position.

3. A device of the class described comprising a supporting structure having converging slots, legs, pivots for mounting the legs on the structure to tilt on angularly-disposed axes and guided by the said slots, and a device connected with the extremities of the legs for moving the same simultaneously to operative or inoperative position.

4. A device of the class described comprising a supporting structure, a rock shaft mounted thereon and having bifurcated ends, supporting legs disposed in the said bifurcated ends, pivots on the bifurcated ends of the shaft for connecting the legs therewith, and a device connected with the extremities of the legs for throwing the latter to operative or inoperative position.

5. A device of the class described, the combination of a supporting structure having slots, means for adjustably mounting the same on a bicycle frame, supporting legs pivotally mounted on the structure and extending through the slots, whereby the latter throw the legs into and out of operative position as the legs swing on their pivots, toggle links connected with the legs for holding the latter in one extreme position, and a locking device mounted on the structure for holding the legs in the other extreme position.

6. In a device of the class described, the combination of a supporting structure having converging slots, legs having their extremities disposed in the slots, means for movably mounting the legs on the structure, and means connected with the legs for moving the same in the slots to open or close the device.

7. A device of the class described comprising a frame having a top plate provided with rearwardly-converging slots, supporting legs mounted on the structure for swinging movement and having their extremities disposed in the slots, toggle links connected with the said extremities, and a handle connected with the toggle links for moving the legs back and forth in the slots.

8. A device of the class described comprising a frame having a top plate provided with rearwardly-converging slots, supporting legs mounted on the structure for swinging movement and having their extremities disposed in the slots, toggle links connected with the said extremities, a handle connected with the toggle links for moving the legs back and forth in the slots, and a locking device for holding the legs in one extreme position, said links serving to hold the legs in the other extreme position.

9. A device of the class described comprising a frame having a top plate provided with rearwardly-converging slots, supporting legs mounted on the structure for swinging movement and having their extremities disposed in the slots, toggle links connected with the said extremities, a handle connected with the toggle links for moving the legs back and forth in the slots, a locking device for holding the legs in one extreme position, said links serving to hold the legs in the other extreme position, and a spring arranged to assist in holding the toggle links straightened.

10. In a device of the class described, the combination of a supporting frame, extensible legs, a rock-shaft mounted on the frame and extending transversely to and disposed between the legs, pivots for connecting the legs with the ends of the rock-shaft, means connecting the upper extremities of the legs together, and devices for holding the legs in open or closed position.

In testimony whereof I affix my signature in presence of two witnesses.

EDWIN HOKE STAYT.

Witnesses:
LAWRENCE JACK,
S. A. RAUGHT.